United States Patent [19]

Marchi

[11] 3,777,504
[45] Dec. 11, 1973

[54] PROCESS AND APPARATUS FOR THE MANUFACTURE OF FROZEN DESSERTS

[75] Inventor: Antonio Marchi, Parma, Italy

[73] Assignee: Foodice Engineering Italiana S.p.A., Parma, Italy

[22] Filed: July 26, 1972

[21] Appl. No.: 275,266

[30] Foreign Application Priority Data
Apr. 1, 1972 Italy .............................. 46846 A/72

[52] U.S. Cl. ......................... 62/73, 62/320, 141/11, 425/130, 425/256, 425/257, 425/289, 425/348
[51] Int. Cl. ............................................. F25c 7/04
[58] Field of Search ............... 62/73, 320; 425/130, 425/256, 257, 289, 348; 141/82, 11; 99/137

[56] References Cited
UNITED STATES PATENTS

| | | | |
|---|---|---|---|
| 2,145,240 | 1/1939 | Adams | 141/11 |
| 2,976,155 | 3/1961 | Heller | 99/137 |
| 2,027,255 | 1/1936 | Vogt et al. | 62/320 |
| 3,085,520 | 4/1963 | Fiedlgr | 62/320 |
| 1,719,931 | 7/1929 | Hall | 425/328 |

*Primary Examiner*—William E. Wayner
*Assistant Examiner*—William E. Tapolcai
*Attorney*—Joseph F. Brisebois et al.

[57] ABSTRACT

Italian Cassatas are manufactured by positioning topless polygonal containers having separable bottoms in holes in a rotating turret which positions them successively beneath a plurality of stations, each of which introduces a different type of ice cream. The filled containers are then frozen, the separable bottoms removed, and the containers filled with ice cream cut into triangular segments by pushing them downwardly through a set of cutting blades.

12 Claims, 9 Drawing Figures

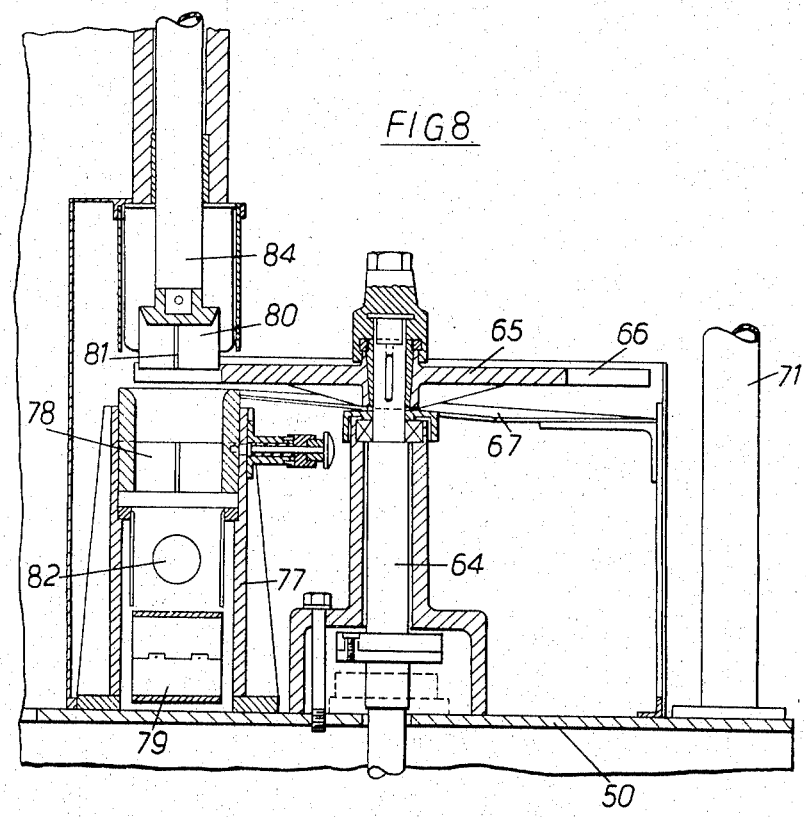
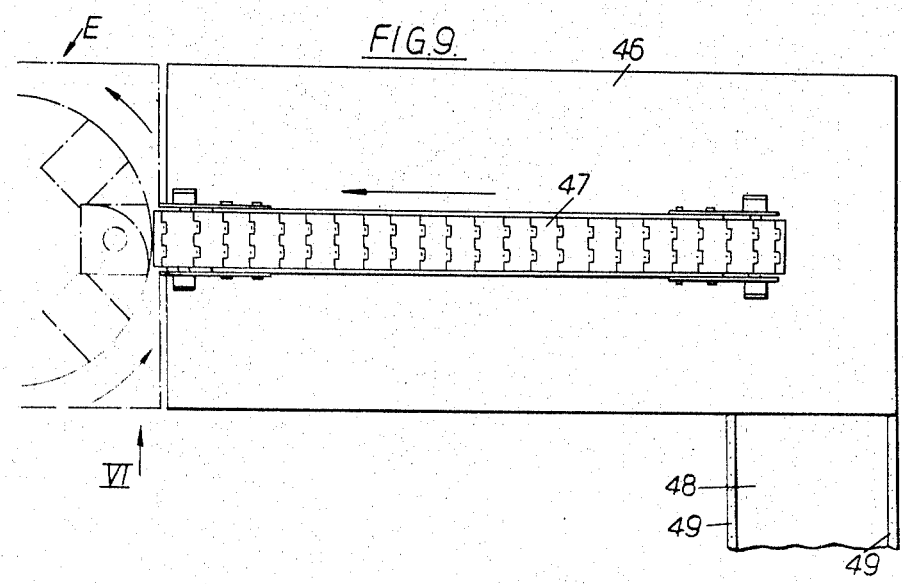

PROCESS AND APPARATUS FOR THE MANUFACTURE OF FROZEN DESSERTS

SUMMARY OF THE INVENTION

The frozen dessert of the "ITALIAN CASATTA" type is in the form of a prism of triangular cross-section, which rests on one of its lateral surfaces and consists of layers of different materials, substantially superimposed one on the other, composed of ice cream of different flavors with or without the incorporation of crystallized fruits.

These characteristics of the cassata have heretofore excluded the possibility of manufacturing it by automatic processes enabling high production rates to be obtained, particularly because of the need to form the individual pieces manually.

The object of the present invention is to make available a process for the production of cassatas which may be carried out mechanically and automatically while allowing the product to retain its particular characteristics of shape and content.

A further object of the present invention is to make available suitable apparatus for carrying out said process mechanically and automatically.

According to the invention, the process for the formation of cassatas comprises the following steps:

a. positioning on an aluminum base a container in the form of a parallelepiped or prism of regular polygonal cross-section open at at least its upper end and made of suitable waterproofed cardboard or other suitable material;

b. positioning this aluminum base and container on a rotating turret;

c. bringing the container successively beneath at least three filler nozzles adapted to introduce three types of ice cream into the upwardly open container;

d. rotating the container about its own axis if so desired, during filling, so that the quantities of ice cream are arranged in three concentric layers;

e. inserting the filled container and base into a freezing tunnel and/or suitable freezing cells to bring the entire creamy mass to a temperature of at least 20° C below zero;

f. removing the aluminum base, after warming it, from the cardboard container;

g. subjecting the container full of ice cream to the action of a hollow punch for separating it into as many triangular segments as there are sides of the regular polygon defined by the cross-section of the cardboard container.

In this manner cassatas are obtained having the classical prismatic triangular form with a resting base of impermeabilized cardboard, or other suitable material, and are composed of at least three superimposed non-intermixed layers of different types of ice cream, with or without the inclusion of pieces of crystallized fruit.

From the foregoing description it can be deduced that the means for mechanically carrying out the process comprise two separate units, in addition to the consumed cardboard container and the aluminum base, namely a filling machine and a cutting machine. Between these two machines, which characterize the apparatus according to the present invention, is the cooling means, in the form of a tunnel or cells, or both in combination, which means which will not be further mentioned in the present description since they are of a conventional type and available in all ice cream manufacturing concerns.

The merits and functional and constructional characteristics of the invention will be more evident from the detailed description given hereinafter with reference to the accompanying drawings, and having as its object a particular preferred embodiment of the invention given purely by way of illustration and example.

The apparatus and process will be described simultaneously, to the advantage of the simplicity and clarity of the description.

FIG. 8 is an enlarged vertical section taken through the working part of the cutting machine.

FIG. 9 is a diagrammatic plan view of the cutting machine.

The figures show the box casing (A) of waterproof cardboard, open at its ends and closed at its bottom by the base (B) of the aluminum. This casing is filled with ice cream at the machine (C), is then passed to the cooling means (D). The base (B) is then removed at the machine (E) and at the outlet of the latter the product emerges divided into four segments, each constituting a "cassata."

Figure 1:
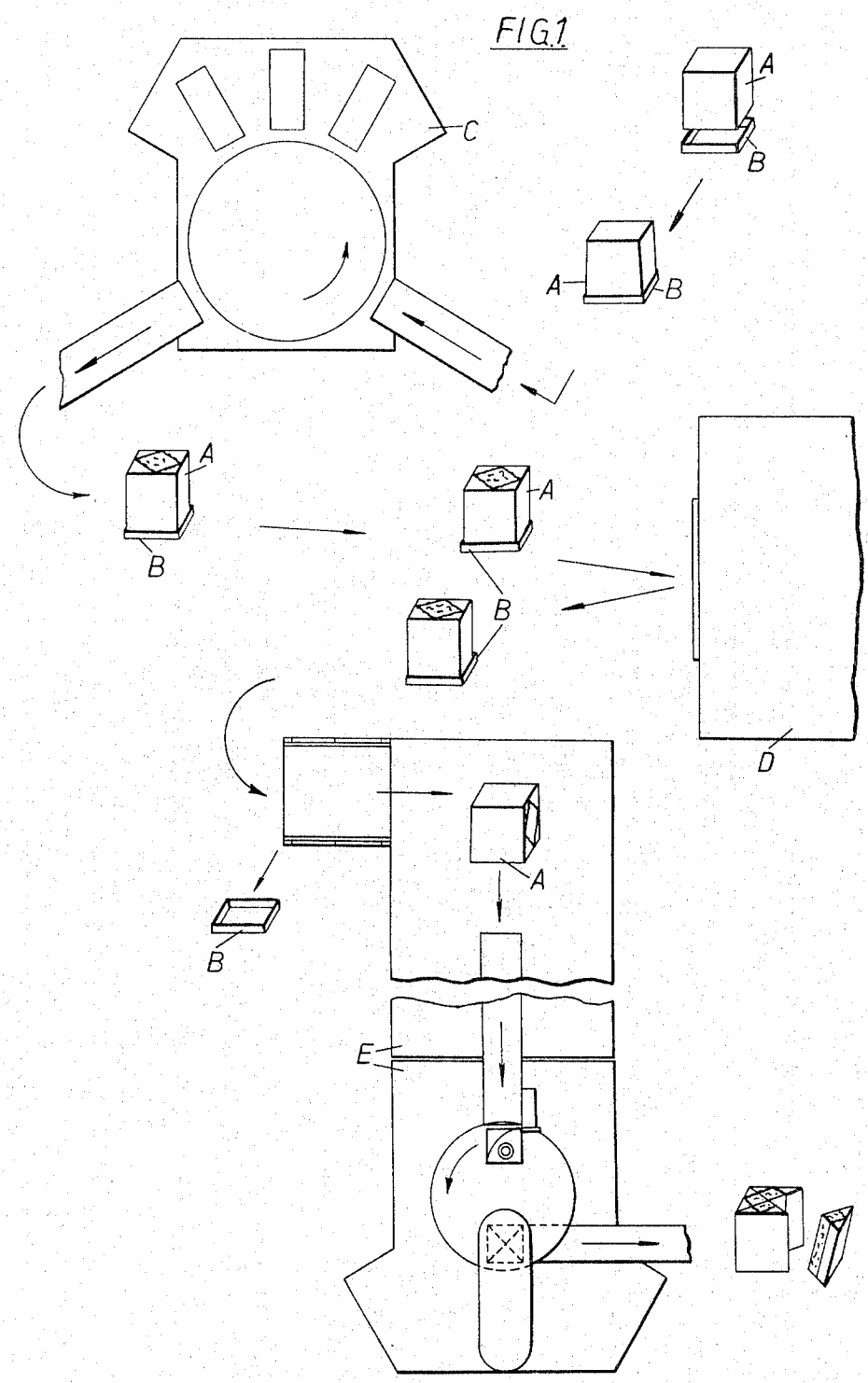
FIG. 1 is a diagrammatic plan view of the layout of the entire apparatus for carrying out the process of the invention.
Figure 2:
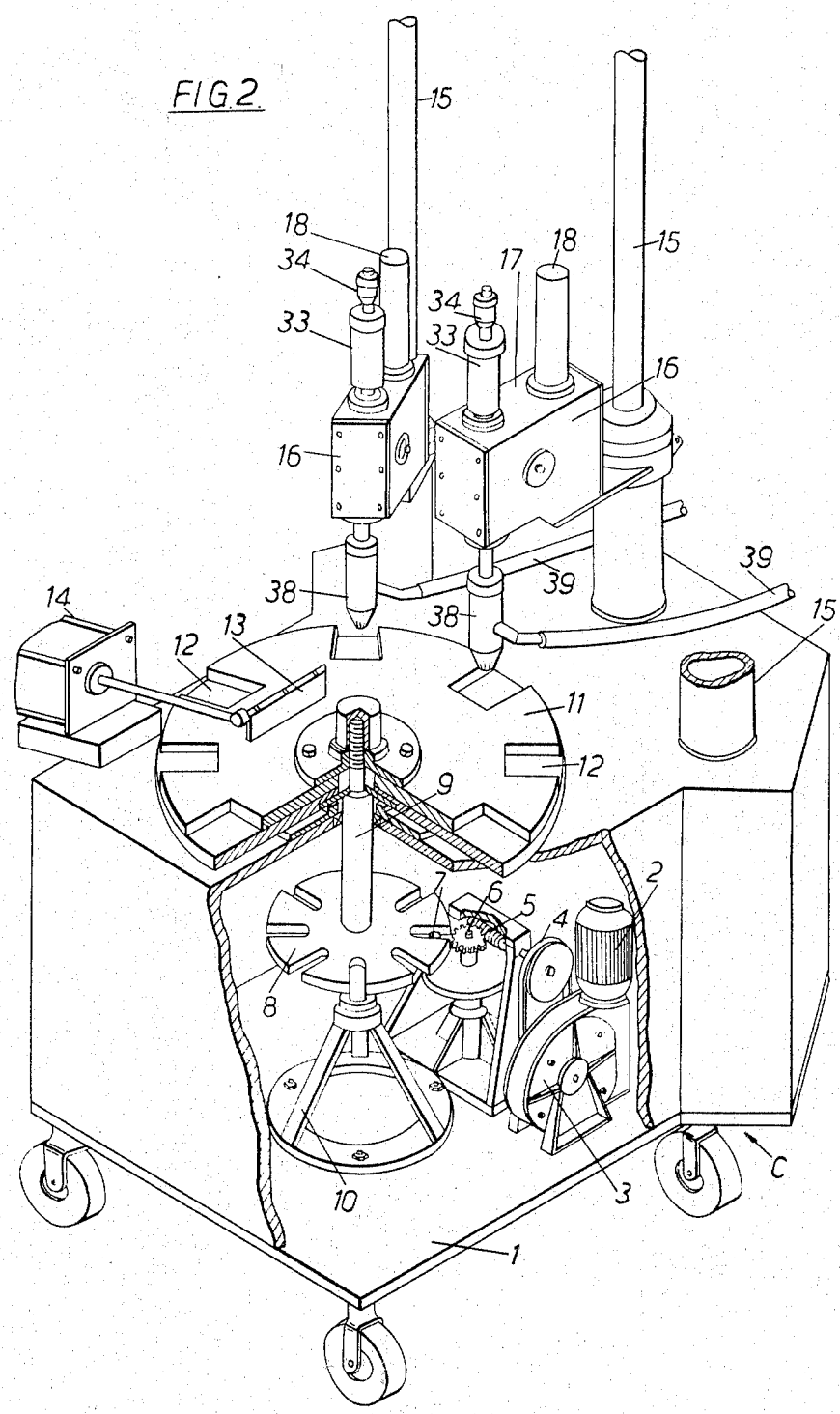
FIG. 2 is a partly sectional perspective view of the filling machine.
Figure 3:
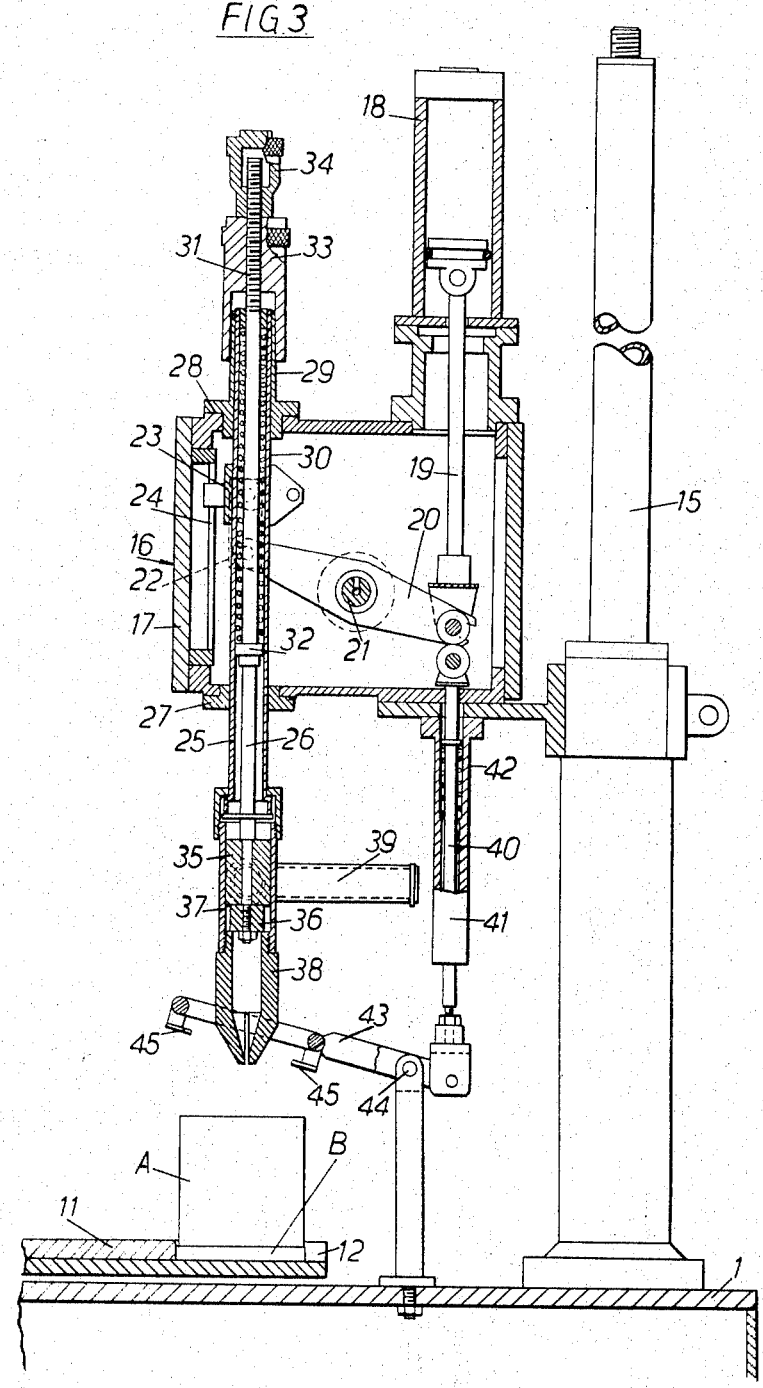
FIG. 3 is a vertical section through a delivery assembly of the filling machine.
Figure 4:
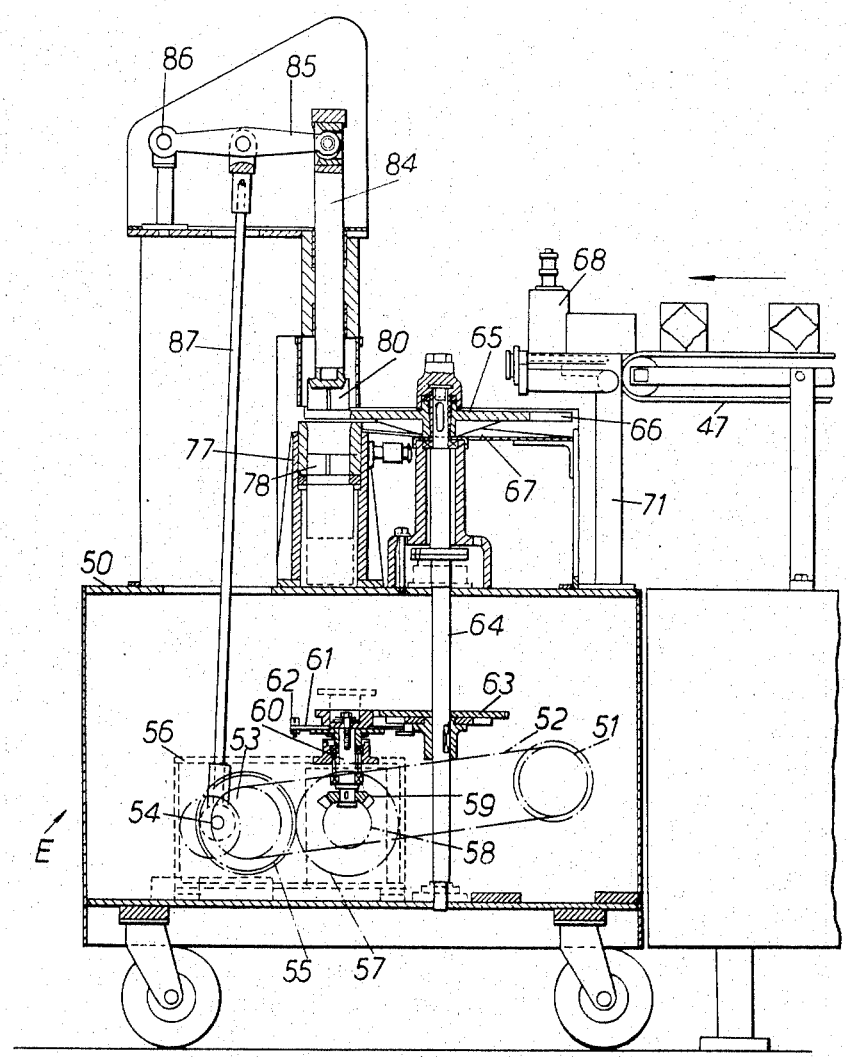
FIG. 4 is a vertical section though the separating or cutting machine.
Figure 5:
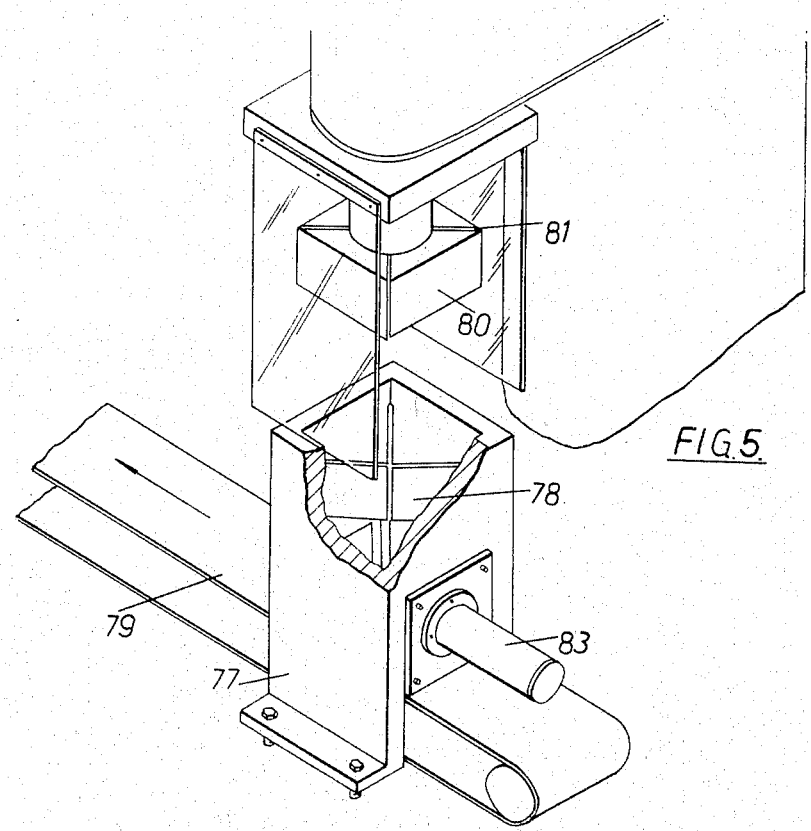
FIG. 5 is an enlarged perspective partially sectional view of the cutting assembly of the cutting machine.
Figure 6:
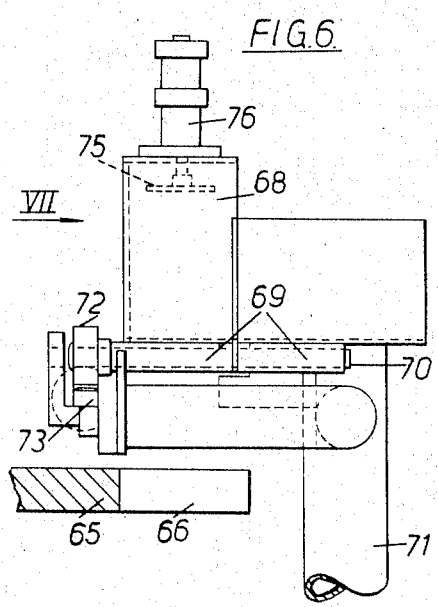
FIG. 6 is a fragmentary view taken in the direction VI shown in FIG. 9.
Figure 7:
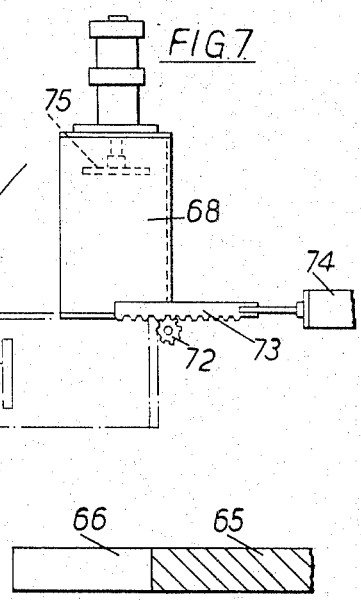
FIG. 7 is a fragmentary view taken in the direction VII shown in FIG. 6.

Filling takes place at the machine (C) shown in FIGS. 2 and 3.

This machine comprises a base 1 containing an electric motor 2, preferably of the self-braking type, coupled at a speed reducer 3. The output shaft of the latter drives through a belt 4 a worm 5 which engages a pinion 6. A pin 7 carried by the pinion 6 cooperates with the wheel 8 to form a "Maltese cross" coupling. The shaft 9 to which is keyed the wheel 8 projects upwardly from the base 1 and is supported axially by the support 10.

This shaft 9 moves with intermittent motion and supports a plate 11 in which are formed peripheral seats 12 adapted to exactly contain the container (A) and its relative base (B).

The feeding of the containers to the plate 11 and their removal from it may be carried out by suitable conveyor belts not shown in the figure.

In particular the full containers are unloaded from the plate 11 onto the conveyor belt by the ejector 13 operated by the cylinder-piston assembly 14. From the base 1 three columns 15 branch upward, each of which supports a feed assembly 16 of the type shown in FIG. 3.

It is evident that said feed assemblies are spaced apart the same distance as the distance between the seats 12, so that during intermittent motion of the plate 11 each seat stops under each of the assemblies 16.

Each of the feed assemblies 16 comprises a box 17 supported by the column 15, and on which is housed a pneumatic cylinder-piston assembly 18. The rod 19 of this latter engages one end of a lever 20, pivotally attached at 21 to the lateral walls of the box 17. The opposite end of the lever 20 is connected by the connecting rods 22 to a fork-shaped slide 23, guided by the rods 24.

The slide 23 embraces the tube 25, housing the rod 26. The tube 25 is axially slidable with respect to the box 17 guided by the lower body 27 and upper body 28. The body 28 extends upwards in the form of the cylindrical tube 29.

The rod 26 is axially slidable within the tube 25 and is biased downward, with relation to the tube, by the spring 30.

This latter acts between the cap 31, screwed to the top of the tube 25, and the shoulder 32 on the rod 26.

The part of the rod 26 which projects above the tube 25 carries screwed thereto the cup-shaped body 33, which is locked in the desired position by the threaded knob 34, which acts as a locking nut.

The part of the rod 26 which projects below the tube 25 carries a piston 35 and a plug 36.

These are located in the cylinder 37 which is rigidly attached to the tube 25, and to the bottom of which is screwed the delivery nozzle 38.

To the lateral wall of the cylinder 37 is connected the tube 39 which feeds the ice cream from suitable pressurized feeders connected upstream.

Entry of the cream into the cylinder is prevented by the piston 35, and is possible only when the piston is raised with respect to the cylinder.

The rod 19 of the cylinder piston assembly 18 also actuates the rod 40, which slides in the guide 41 fixed to the box 17. The rod 40 is urged upward by the spring 42.

The lower end of the rod 40 is pivoted to the lever 43, which turns about the pivot pin 44 and carries at its opposite end the two sections 45 which hold the container (A) still while it is being filled.

The operation of the feed assembly heretofore described is believed obvious:

During the stationary periods of the plate 11, the rod 19 is raised and the assembly comprising the tube 25, rod 26 and sections 45 is lowered for a certain distance. When the cup body 33 rests against the cylindrical tube 29, the descent of the rod ceases and the tube 25 continues to descend alone. The descent of the sections 45 ceases when they rest on the edge of the container (A). The successive descent of the tube 25 with respect to the stationary rod 26 causes opening of the inlet port of the tube 39 for feeding the ice cream, and this flows out through the nozzle 38. The return of the rod 19 to its original position restores the closed conditions.

The containers (A), filled during their successive stops under the three delivery units 16, are then removed from the plate 11 by the ejector 13 and fed to the cooling assemblies (D), consisting partly of a tunnel and partly of freezing cells.

After a convenient length of time, necessary for causing the homogeneous hardness of the entire mass, the containers (A) full of ice cream, and provided with the aluminum base (B), are fed to the machine (E) for cutting the cassatas.

This machine, with particular reference to FIGS. 4 to 9 comprises a feed assembly upstream of the actual cutting assembly.

The feed assembly (see FIG. 9) comprises a base 46 supporting a conveyor 47 driven with continuous motion by a motor, not shown, and having a width equal to the height of the containers (A), which are arranged on it downward with their open ends to the sides. Adjacent the base 46 is a heated surface 48 provided with two dovetail guides 49. The containers (A) rest on the surface 48 while lying on their aluminum base (B), so that the separation of their base by engaging its edge under one of the two guides 49 is facilitated.

The conveyor 47 is at the same level as the loading station of the cutting assembly.

This latter comprises a base 50 within which an electric motor 51 drives a wheel 43 carrying an eccentric pin 54 through the chain drive 52.

The wheel 53 is rigidly attached to a gear wheel 55 of greater diameter, contained in the box 56.

The gear wheel 55 engages the wheel 57, which is rigidly attached to a bevel gear 58, which forms with the gear 59 right angle transmission. The gear 59 is mounted to the vertical shaft 60 which supports the disc 61 provided with the eccentric pin 62. This latter forms with the wheel 63 a "Maltese cross" mechanism which imparts an intermittent motion to the wheel 63.

This latter is keyed to a vertical shaft 64, which projects upwardly from the base and supports a disc 65 which comprises the same number of peripheral apertures 66 as there are peripheral cavities in the Maltese wheel, each peripheral aperture 66 passing completely through the disc 65. Beneath one half of the disc 65 is an inclined surface 67 located some distance from the disc at the loading station, and at a minimum distance from the disc immediately upstream of the cutting station. On this surface the containers which are inserted into the aperture 66 are supported upright. The loading station, situated at the same level as the conveyor 47, comprises a box housing 68, which in the raised position has two open sides, namely the side overlooking the conveyor 47 and one of the adjacent sides. The housing 68 is located following the belt 47 and into it flow one at a time the containers (A) full of hardened ice cream.

At its lower edge opposite its open side the housing 68 comprises hinges 69 mounted on the pivot pin 70 which extends horizontally from the plate 71 fixed to the base 50. Rigid with the housing 68 and coaxial with the pivoting system 67–70 is a pinion 72 engaging the straight track 73 so that the traverse motion imposed on this latter by the cylinder-piston assembly 74 results in 90° rotations of the housing 68.

During these rotations the housing 68 drops the container (A) into the underlying aperture 66 in the disc 65, resting it on the inclined surface 67.

The housing 68 comprises a cap 75 operated by the cylinder-piston assembly 76 and adapted to clamp the container (A) within the housing 68.

Below the disc 65 in a position diametrically opposite to that of the housing 68 is a chamber 77 which reproduces in plan view the dimensions of the container (A). In particular the chamber 77 is placed immediately beyond the surface 67 so that the containers (A), drawn by the disc 65 until they leave the suface 67, fall into it upright. Inside the chamber 77 are four fixed blades 78, positioned along the diagonals of the chamber, and these divide the container (A) into four segments which fall onto the underlying belt conveyor 79.

The container (A) is forced to pass through the blades by an upper plunger 80 which comprises four slots 81 which receive the blades.

In order to facilitate removal of the block of ice cream from the plunger 80, there is a pusher 82 at right angles thereto and under the blades which is operated by a cylinder-piston assembly 83.

The plunger 80 is at the end of the rod 84 which oscillated by the rocker arm 85 pivoted at 86, and the connecting rod 87 derived from the eccentric pin 54. The segments of the container (A) each constitute a cassata which is removed by the belt 79, and fed to the packaging devices situated downstream.

The invention is not limited to the embodiments hereinbefore described, and modifications and improvements thereof may be made without departing from the scope of the invention, the fundamental characteristics of which are summarized in the following claims.

I claim:

1. Process for the mechanical production of frozen desserts known as "ITALIAN CASSATA" comprising the following steps:
   a. positioning a container having two open ends and a regular polygonal cross-section on a separable base;
   b. positioning said base and container on a rotating turret;
   c. rotating said turret to bring said container successively beneath at least three filler nozzles adapted to introduce three types of ice cream into said container;
   d. introducing said container and base into freezing means which brings it to a temperature at least 20° C below zero;
   e. removing said base, and
   f. slicing the container full of ice cream into as many triangular segments as there are sides of the regular polygon defined by the cross-section of the container.

2. Apparatus for producing frozen desserts known as "ITALIAN CASSATA," said apparatus comprising a rotatable turret adapted to bring containers having a polygonal cross-section and a separable metal base successively into each of a plurality of stations, said stations comprising sucessively means for introducing into said container a different type of ice cream; freezing means for uniformly hardening the cream in the container; heating means for heating said base to facilitate its separation and removal from said container, and means for cutting the filled container into segments after removal of said base.

3. Apparatus as claimed in claim 2 in which each filling station comprises a column, a support box mounted on said column for adjustment upward and downward, said box comprising two vertically aligned seats, a tube axially slidable in said seats and containing an axially slidable rod projecting from the top of the tube and carrying a stop member, a piston projecting downwardly from the tube, said tube terminating at its lower end in a cylindrical body provided with a lower nozzle and containing the piston, a feed tube for the ice cream under pressure projecting from the wall of said cylindrical body and so positioned that its inlet port into said cylindrical body is opened and closed by the piston, means in the box for causing simultaneous lowering of both the axially slidable tube and rod and successive lowering of the axially slidable tube only with respect to the rod to open the port for the introduction of ice cream into the cylindrical body.

4. A machine as claimed in claim 3 comprising a spring between the tube and rod which biasses the rod downward with respect to the tube.

5. A machine as claimed in claim 3, comprising a cylinder-piston assembly having a rod which extends into the support box and operates a rocker arm which causes vertical sliding of a slide member connected to the tube.

6. A machine as claimed in claim 3 in which the stop member attached to the rod rests, during the descent of the tube and rod, against a stop rigid with the box.

7. A machine as claimed in claim 2 which comprises feed means adapted to pick up said container, while lying on one of its sides from a belt conveyor and to place it upright within a hole in an intermittently rotating disc above a support surface which lies beneath one half of said disc and which extends to a position diametrically opposite that of the feed means, and a cutting device positioned at the end of the support surface, said cutting device comprising a chamber having a vertical axis and substantially the same cross-section as the container, four transverse blades in said chamber which extend from its center toward its corners, and a vertical plunger intermittently driven to push the container through the blades, and provided with suitable slots into which said blades enter.

8. A machine as claimed in claim 7, in which the feed means comprises a box situated in alignment with a belt conveyor, said box being open on two adjacent vertical sides, and pivoted parallel to one of these sides at one of its lower edges, so as to be able to swing a container full of ice cream through 90° into one of the openings in the underlying disc.

9. A machine as claimed in claim 8, in which the box fixed to a pinion coaxial with the pivot, which pinion meshes with a rack which slides axially in suitable guides and is connected to a cylinder piston assembly, so that linear movement of the rack is transformed into rotation of the box housing.

10. A machine as claimed in claim 8, in which top of the box carries a cylinder piston assembly comprising a rod which extends into the box itself and supports a cap for clamping the container.

11. A machine as claimed in claim 7, in which the support surface situated below the disc is inclined with respect to the disc so as to lie at a maximum distance from it just less than the height of the containers at the feed device, and at a minimum substantially zero, distance from it at a diametrically opposite position immediately upstream of the cutting chamber.

12. A machine as claimed in claim 7, comprising an electric motor connected by suitable speed reduction means both to the drive element of "Maltese cross" gearing which drives the upper disc with intermittent motion, and to a crank mechanism whose connecting rod transmits its motion to the vertical pusher through a suitable rocker arm.

* * * * *